FLUID SHIFT FLIP-FLOP

Filed Jan. 19, 1965

|  | A | B | C |
|---|---|---|---|
| CLR | 0 | 0 | 0 |
| FIRST PULSE | 1 | 0 | 0 |
| SECOND " | 1 | 1 | 0 |
| THIRD " | 1 | 1 | 1 |
| FOURTH " | 0 | 1 | 1 |
| FIFTH " | 0 | 0 | 0 |
| CLEAR " | 0 | 0 | 0 |

INVENTOR.
GEORGE R. COGAR
BY
Thomas P. Murphy
AGENT

United States Patent Office 3,410,312

Patented Nov. 12, 1968

3,410,312

FLUID SHIFT FLIP-FLOP

George R. Cogar, Frankfort, N.Y., assignor to Sperry Rand Corporation, New York, N.Y., a corporation of Delaware Filed Jan. 19, 1965, Ser. No. 426,626
3 Claims. (Cl. 137—81.5)

ABSTRACT OF THE DISCLOSURE

A fluid shift flip-flop is disclosed wherein a fluid tri-stable element is used to control a fluid bi-stable element. The first and second outputs of the tri-stable element are connected to the first and second control channels of the bi-stable element and input pulses are applied to the power input channel of the tri-stable element. The tri-stable element has the property of being insensitive to switch the input pulses between its first and second output channels in response to the establi hment of control signals applied to its first and second control channels during an input pulse, but responsive to switch said input pulses between its first and second output channels in the presence of control signals which are established before the application of the input pulses.

This invention relates to a fluid logic element and more particularly to a fluid logic element which is responsive to the leading edge of a fluid pulse input without regard to the duration of the pulse.

The relatively recent discovery that high energy fluid streams can be controlled by means of low energy fluid streams without the aid of moving parts initiated a major research and development effort in this country. Control of high energy fluid streams by low energy fluid streams implies amplification and so the term fluid amplifier was evolved for the fluid devices which performed this function. Other fluid devices were developed in rapid succession which because of their apparent similarities to well known electronic devices are called fluid oscillators, fluid multi-vibrators, fluid AND gates, fluid OR gates, etc.

The advantages of these fluid devices over the equivalent electronic elements have become well known. For example, fluid devices require no moving parts, are not subject to burn out, are easier and more economical to construct, minimize repairing and replacement and more importantly they are capable of operation under extreme environmental conditions such as temperature, humidity and vibratory motion.

As the fluid amplifier technology advanced complicated circuitry was designed and built which employed only fluid devices. Most of this circuitry functioned exceedingly well and as a result the feasibility of building computers employing only fluid devices was realized. However, such an undertaking required the design and construction of many basic computer components and logic elements.

The present invention contemplates such an element. The logic element of the present invention is a fluid shift flip-flop ideally suited to be the basic logical element in a fluid shift register. Although the fluid shift flip-flop of the present invention was designed for use in a fluid shift register, it is pointed out that it has general utility and may be used as a logical element in fluid circuitry where its particular functional characteristics are found desirable.

The fluid shift flip-flop of the present invention has the capability of operation on the leading edge of the fluid shift pulse without regard to its maximum duration. The fluid shift flip-flop of the present invention comprises in combination two OR gates, a bi-stable flip-flop and a tri-stable flip-flop. The combination is such that the bi-stable flip-flop may change its condition or stable state only once for each fluid shift pulse applied to the input of the tri-stable flip-flop. Control pulses applied to the tri-stable flip-flop are ineffective to change the state of the tri-stable flip-flop while the fluid shift pulse is present.

Therefore, it is an object of the present invention to provide a pulse responsive fluid device capable of operating on the leading edge of an input pulse.

It is another object of the present invention to provide a pulse responsive fluid device which is unaffected by the duration of the input pulse.

A further object of the present invention is to provide a fluid shift flip-flop capable of operating on the leading edge of the shift pulse input which is unaffected by the duration of the shift pulse input.

Yet another object of the present invention is to provide a fluid element which may be used as the basic element of construction of a fluid shift register which fluid element may operate on the leading edge of the shift pulse input without regard to the maximum duration of the shift pulse input.

These and other objects as well as the many attendant advantages of the present invention will become more apparent upon the reading of the description in conjunction with the drawing wherein.

Figures 1, 2, 4:
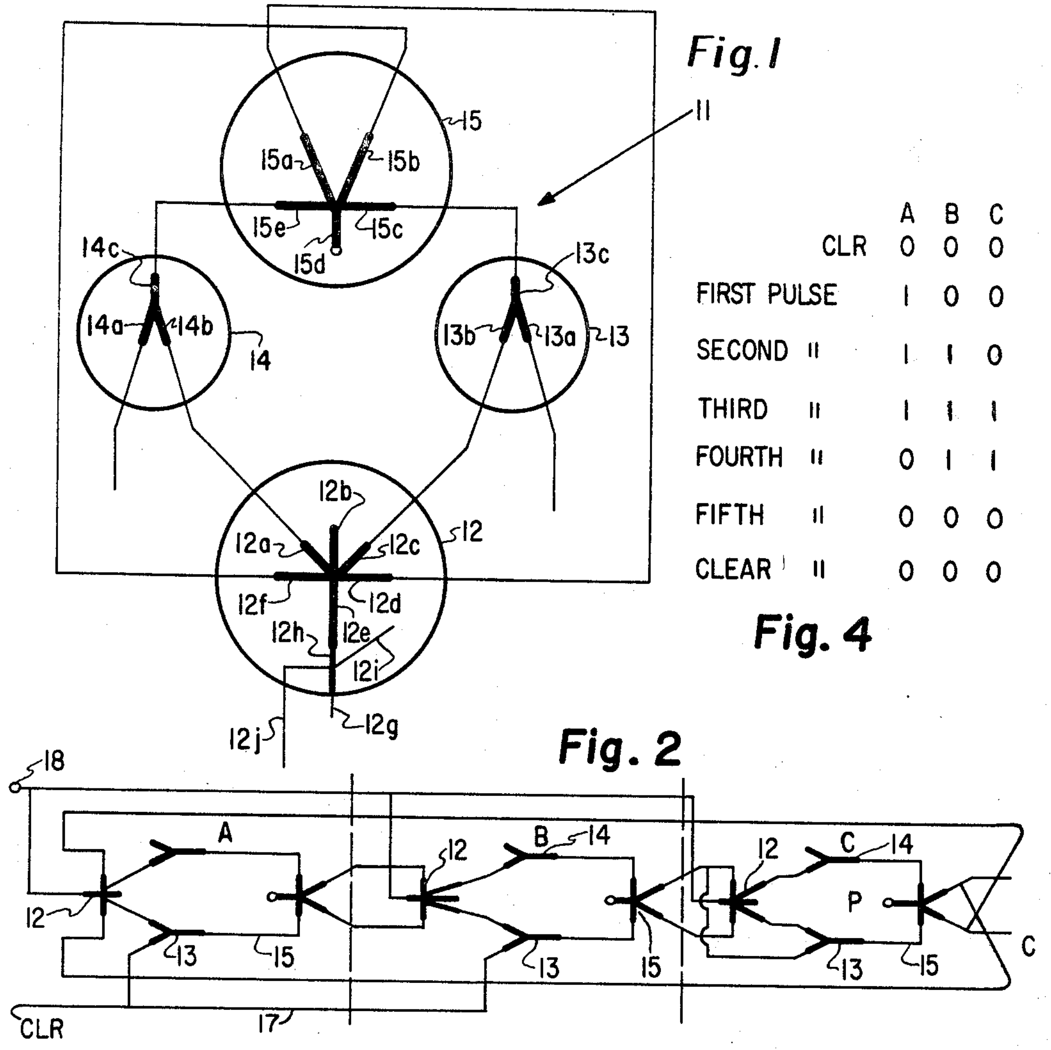
FIGURE 1 illustrates a preferred embodiment of the fluid shift flip-flop of the present invention.
FIGURE 2 illustrates a fluid shift register employing the fluid shift flip-flop of the present invention as a basic element.
FIGURE 4 is an operation diagram explanatory of the register of FIGURE 2.

Referring now more particularly to FIGURE 1 there is shown a fluid shift flip-flop 11 comprising a tri-stable flip-flop 12, OR gates 13 and 14 and a bi-stable flip-flop 15 connected in a manner to be more fully described hereinbelow.

Bi-stable flip-flop 15 may be of any conventional type, for example, it may be of the type shown in the patent to Woodward, 3,124,999, issued Mar. 17, 1964. It may be of a type similar to that shown in the patent to Norwood, 3,128,039, issued Apr. 7, 1964. Bi-stable flip-flop 15 comprises output channels 15*a*, 15*b*, control channels 15*c* and 15*e* and power input channel 15*d*. When power fluid is applied to the power input channel 15*d*, a power stream will be emitted through either output channel 15*a* or 15*b* depending on the symmetry of the flip-flop 15. If, for example, the power stream is emerging from the output channel 15*a* and a control input such as a fluid pulse is applied to the control channel 15*e*, the power stream is switched from the output channel 15*a* to the output channel 15*b* and remains at the output channel 15*b* even after the control input pulse at the channel 15*e* has ceased. This is due to the well known "lock-on" phenomena whereby the power stream is attracted to the side wall of the particular channel in which it happens to be. The power stream is caused to unlock only by the application of a control pulse of sufficient magnitude.

Fluid OR gates 13 and 14 are identical in construction and function and may be of the well known conventional type, that is, each having two input channels communicating with a single output channel wherein an input applied to either one or the other of the input channels emerges from the output channel. The OR gate 13 comprises input channels 13*a* and 13*b* and an output channel 13*c*. The output channel 13*c* of the OR gate 13 is connected to the control channel 15*c* of the bi-stable flip-flop 15 substantially as shown in the drawing. The OR gate 14 comprises input channels 14*a* and 14*b*, and an output channel 14*c*. The output channel 14*c* of the OR gate 14 is connected to the control channel 15*e* of the bi-stable flip-flop 15 in a manner similar to that of the OR gate 13.

The tri-stable flip-flop 12 is of a more recent development; the details of construction and operation of which are not yet readily available to the art. Therefore, the tri-stable flip-flop 12 is discussed in some detail hereinbelow.

The tri-stable flip-flop 12 comprises three output channels 12*a*, 12*b* and 12*c*. It further comprises control channels 12*d*, and 12*f*, and an input channel 12*e*. The tri-stable flip-flop 12 may have a built-in inverter circuit. The inverter circuit comprises a power input channel 12*g* which is normally connected to a continuous supply of power fluid. An output channel 12*h* is connected to the input channel 12*e* and supplies the main tri-stable element with power fluid. Communicating also with the input channel 12*g* is an output channel 12*i* which opens to a low pressure dump, for example, the atmosphere or alternately it may be connected to the power supply (not shown). An input channel 12*j* is connected substantially as shown to the input channel 12*g* and it is the input channel 12*j* which is adapted to receive the input pulses. When an input pulse appears at the input channel 12*j*, the power stream in the input channel 12*g* is diverted to the output channel 12*i* from the output channel 12*h* thereby removing the input from the input channel 12*e* for the duration of the pulse applied at the channel 12*j*.

The output channel 12*a* of the tri-stable flip-flop 12 is connected to the input channel 14*b* of the OR circuit 14 and the output channel 12*c* is connected to the input channel 13*b* of the OR gate 13.

The tri-stable flip-flop 12 is capable of assuming three stable states represented by an output power stream appearing in the output channel 12*c*, 12*b* or 12*a*. When the power stream is applied to the input channel 12*e* and no control pulses are being applied to either control channels 12*f* or 12*d*, the power stream emerges from the output channel 12*b*, e.g., into a low pressure dump. However, when the power stream is emerging from the output channel 12*b* and a control pulse is applied to control channel 12*f*, the power stream is switched from the output channel 12*b* to the output channel 12*c*. Due to the well known "lock-on" or "boundary layer" effect the power stream remains at output channel 12*c* after the control pulse at the control channel 12*f* has ceased. However, a control pulse appearing at the control channel 12*d* when the power stream is in the output channel 12*c* will not switch the power stream to the output channel 12*a*. The only way a control pulse at the control channel 12*d* can switch power stream to the output channel 12*a* is if the power stream applied to the input channel 12*e* is terminated and then reinitiated while a control pulse is being applied to the control channel 12*d*. Thus, the tri-stable flip-flop 12 must be reset before each switching operation and in the configuration shown this resetting occurs when an input pulse is applied to the input channel 12*j*. This terminates the power stream at the input channel 12*e* for the duration of the input pulse. It should be understood, however, that a control pulse of greatly increased power may cause switching whether or not the power stream is terminated. This possibility can be eliminated by use of control signals below some predetermined value.

The chief distinction in the operation of the flip-flop 15 and the tri-stable flip-flop 12 lies in the inability of the tri-stable flip-flop 12 to switch from the output channel 12*c* to the output channel 12*a* or vice versa unless the tri-stable flip-flop 12 is reset, that is, the power stream is terminated and reinitiated.

When a pulse is applied to the input channel 12*j*, the power stream terminates at the input channel 12*e*. When the pulse terminates, the power stream again is applied to the input channel 12*e*. When the pulse terminates and no control signal is present at either control channel 12*f* or 12*d*, the power stream emerges from the output channel 12*b*. However, if the pulse terminates and a control signal is present at either control channel 12*f* or 12*d*, then the power stream switches to the output channel 12*c* or 12*a*, respectively. Subsequent changes of signals applied to the control channels 12*d* and 12*f* are ineffective to change the switched condition of tri-stable flip-flop 12 as long as the power stream applied at input channel 12*e* is not terminated by a pulse applied to the input channel 12*j*. When the power stream is in the output channel 12*a*, it is applied to the control channel 15*e* of the bi-stable flip-flop 15 through the OR gate 14. If the power stream applied to input channel 15*d* had been at the output channel 15*a*, the appearance of the power stream at the control channel 15*e* causes the power stream to switch from the output channel 15*a* to the output channel 15*b*. As long as the power stream is present at the input channel 12*e*, no control signal applied at the input channel 12*f* can cause the power stream to switch from the output channel 12*a*. Thus, the power stream that has been switched from channel 15*a* to the output channel 15*b* must remain in that switched condition until the power stream at the input channel 12*e* terminates at least momentarily.

If when the power stream at the input channel 12*e* is reinitiated at the time when a control signal is being applied to the control channel 12*f*, the power stream switches to the output channel 12*c* and is applied to the control channel 15*c* of the bi-stable flip-flop 15 through the OR gate 13. When this occurs, the power stream switches from the output channel 15*b* to the output channel 15*a*. Switching of the flip-flop 15 is not again possible until the tri-stable flip-flop 12 has been reset as by application of a pulse to the input channel 12*j*. Thus, the output of the flip-flop 15 is determined by the status of the control inputs at the control channel 12*d* or 12*f* prior to the application of an input signal.

The fluid shift flip-flop 11, as shown, operates on the trailing edge of the positive shift pulse applied to input channel 12*j*. In other words, switching occurs coincidently with the reinitiation of the power stream at input channel 12*e*. The fluid shift flip-flop 11 also may be thought of as operating on the leading edge of the negative shift pulses (no pulse) in a train of positive shift pulses.

In order to cause the fluid shift flip-flop to operate on the leading edge of the positive shift pulse, the inverter would be left out of tri-stable flip-flop 12 and the shift pulses would be applied directly to the input channel 12*e*.

The fluid shift flip-flop of FIGURE 1 may be readily converted to a modulo 2 counter by connecting output channel 15*a* to the control channel 12*d* of the tri-stable flip-flop 12 and the output channel 15*b* to the control channel 12*f* of the tri-stable flip-flop 12.

Figure 3:
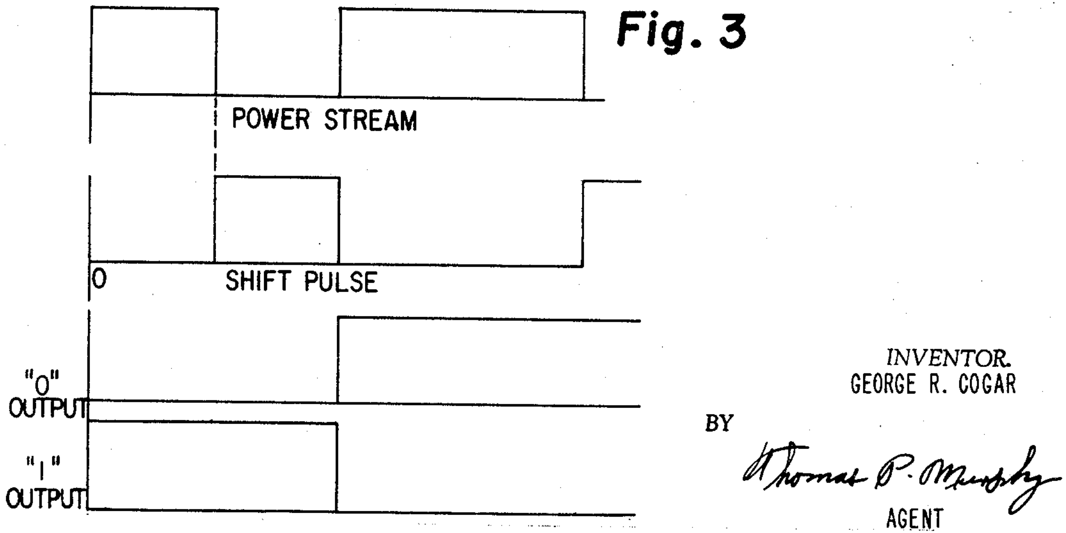
FIGURE 3 is a graphical representation of the pulse relationships involved.

The operation of the modulo 2 counter may be understood by reference to the graphical representation of pulse relationship shown in FIGURE 3. Thus, when the output channel 15*a* is activated with a power stream, the cessation of the positive fluid shift pulse applied to the input channel 12*j* (which in fact reinitiates the power stream at the input channel 12*e*) causes the power stream of the flip-flop 15 to switch from the output channel 15*a* to the output channel 15*b*, thus applying a control signal to the input channel 12*f*. However, this control signal applied at the input channel 12*f* is ineffective to switch the power stream of the tri-stable flip-flop 12 from the output channel 12*a* to the output channel 12*c* until the fluid shift pulse is reinitiated and terminated. Upon the termination of the fluid shift pulse the power stream is again applied to the input channel 12*e* causing switching of the power stream from the output channel 12*a* to the output channel 12*c*.

The operation of the fluid shift flip-flop is further illustrated by its utilization in the modulo 5 fluid shift counter shown in FIGURE 2. The modulo 5 counter of FIGURE 2 employs three fluid shift flip-flops of the present invention in a cascaded arrangement. The fluid shift flip-flops A, B and C employed in the modulo 5 counter of FIGURE 2 differ from the fluid shift flip-flop as described with reference to FIGURE 1 in that the tri-stable flip-flops do not use an inverter, that is, the shift pulse is applied directly to the power input channel of the tri-stable flip-flop.

The fluid shift register of FIGURE 2 comprises three fluid shift flip-flops A, B and C as described in FIGURE 1. The output channels of the bi-stable flip-flop 15 of the fluid shift flip-flop A are connected to the control channels of the tri-stable flip-flop of the fluid shift flip-flop B, as shown. The output channels of the bi-stable flip-flop 15 of the fluid shift flip-flop B are connected to the control channels of the tri-stable flip-flop of the fluid shift flip-flop C. The output channels of the bi-stable flip-flop 15 of the fluid shift flip-flop C are connected to the control channels of the tri-stable flip-flop 12 of the fluid shift flip-flop A substantially as shown.

The "0" output channel of the bi-stable flip-flop 15 of the fluid shift flip-flop B is connected to one input of the OR gate 13 of the fluid shift flip-flop C as shown. A conduit 17 is connected to one side of the OR gates 13 of each of the fluid shift flip-flops A and B in a parallel arrangement. Thus, a fluid pulse applied to conduit 17 resets each of fluid shift flip-flops A, B and C to the "0" state, with flip-flop C being indirectly reset by 17 due to the action of flip-flop B as previously mentioned. A conduit 18 is connected in parallel to each of the input channels of the tri-stable flip-flops of fluid shift flip-flops A, B and C, substantially as shown. Thus, a fluid shift pulse applied to the input terminal of the conduit 18 is directly applied to the input channels of each of the tri-stable flip-flops.

The operation of the fluid shift register of FIGURE 2 is best explained in conjunction with the operation diagram of FIGURE 4. Assume that the fluid shift register is in its initial state, that is, with power being supplied to all of the bi-stable flip-flops 15 and each of the bi-stable flip-flops being in its "0" state. In this condition the "0" output channel of the bi-stable flip-flop 15 of the fluid shift flip-flop C supplies a signal to one of the control channels of the tri-stable flip-flop 12 of the fluid shift flip-flop A. This is the cleared condition shown by line 1 in the operation diagram of FIGURE 4.

The first fluid shift pulse applied on conduit 18 effects fluid shift flip-flop A only, that is, the state of the bi-stable flip-flop 15 is changed from its "0" condition to its "1" condition. Fluid shift flip-flops B and C are unaffected by the first shift pulse. The second fluid shift pulse to be applied changes the state of the fluid shift flip-flop B without affecting the state of fluid shift flip-flop A or C. The third fluid shift pulse to the applied changes the state of the fluid shift flip-flop C without affecting the state of fluid shift flip-flop A or B. After the third fluid shift pulse all of the fluid shift flip-flops A, B and C are in the "1" state. The fourth fluid shift pulse applied changes the condition of the fluid shift flip-flop A from the "1" to the "0" state without affecting the states of the fluid shift flip-flop B or C. The fifth fluid shift pulse applied over conduit 18 changes the state of the fluid shift flip-flop B without affecting the state of the fluid shift flip-flop A. With the fifth fluid shift pulse fluid shift flip-flops A, B and C are in the "0" state. A fluid pulse over conduit 17 clears the fluid shift register regardless of the particular state in which it happens to be.

The embodiments of the invention in which an exclusive property or privilege is claimed are defined as follows:

1. A fluid logic device comprising in combination: a tri-stable fluid element having an input channel, first, second and third output channels, and first and second control channels, a source of fluid, a source of fluid pulses, means connecting said source of fluid to said input channel, means being responsive to said source of fluid pulses for disconnecting said source of fluid from said input channel in response to each of said pulses thereby to provide input pulses to the input channel of said tri-stable element, a bi-stable fluid element having an input channel first and second control channels, and first and second output channels, means connecting said first and second output channels of said tri-stable element to said first and second control channels of said bi-stable element, respectively, said tri-stable fluid element being insensitive to switch said input pulses between its first and second output channels in response to the establishment of control signals applied to its first and second control channels during an input pulse, but responsive to switch said input pulses between its first and second output channels in the presence of control signals which were established before the application of said input pulses.

2. A fluid logic device in accordance with claim 1 wherein said means further includes; a first fluid OR gate having first input channel connected to said first output channel of said tri-stable element, an output channel connected to said first control channel of said bi-stable element, and a second input channel for receiving a clearing pulse, a second fluid OR gate having a first input channel connected to said second output channel of said tri-stable element and an output channel connected to said second control channel of said bi-stable element, and a second input channel for receiving a clearing pulse.

3. The combination set forth in claim 1 wherein the control signals for the tri-stable element are obtained from the respective outputs of the bi-stable fluid element.

References Cited

UNITED STATES PATENTS

| | | | |
|---|---|---|---|
| 3,148,691 | 9/1964 | Greenblott | 137—81.5 |
| 3,191,612 | 6/1965 | Phillips | 137—81.5 |
| 3,193,197 | 7/1965 | Bauer | 137—81.5 |
| 3,232,305 | 2/1966 | Groeber | 137—81.5 |
| 3,253,605 | 5/1966 | Grubb | 137—81.5 |
| 3,277,915 | 10/1966 | Dockery | 137—81.5 |
| 3,192,938 | 7/1965 | Bauer | 137—81.5 |

SAMUEL SCOTT, *Primary Examiner.*